Feb. 7, 1939.                J. KIRGAN                2,146,260
                        CONTROLLING APPARATUS
                         Filed March 20, 1936
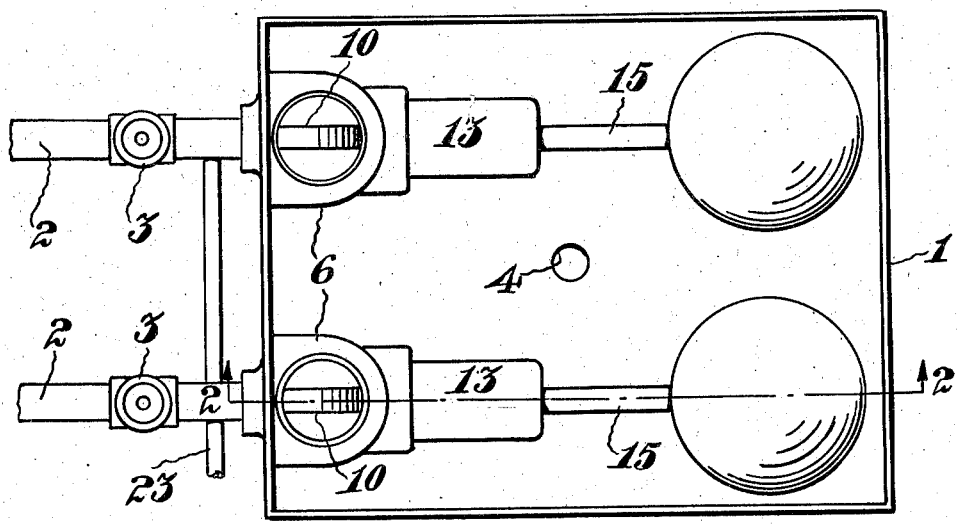
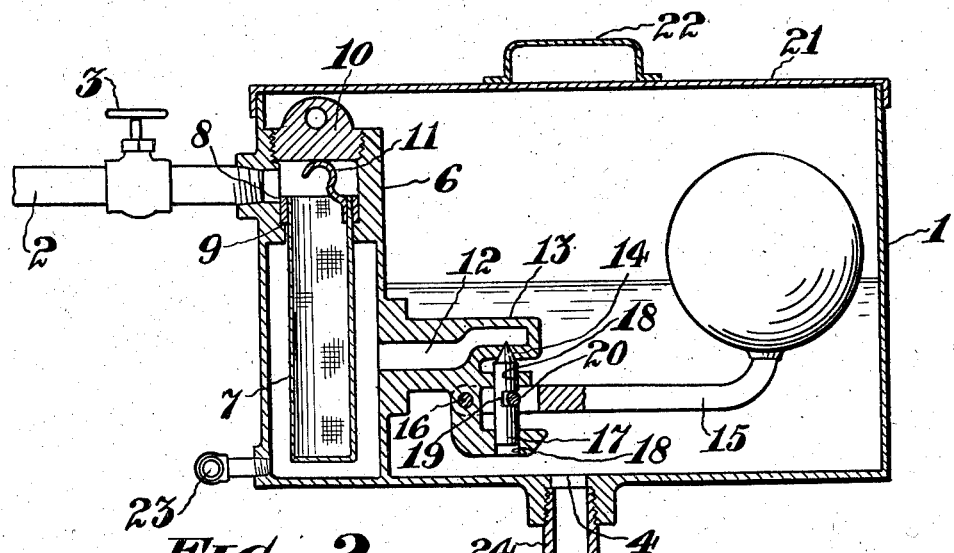
INVENTOR.
John Kirgan
BY
HIS ATTORNEY Patented Feb. 7, 1939

2,146,260

UNITED STATES PATENT OFFICE 2,146,260

CONTROLLING APPARATUS

John Kirgan, Easton, Pa., assignor to Ingersoll-Rand Company, Jersey City, N. J., a corporation of New Jersey Application March 20, 1936, Serial No. 69,818

2 Claims. (Cl. 210—166)

This invention relates to apparatus for purifying and controlling a liquid sealing medium, and particularly a sealing medium for the walls of enclosures which are penetrated by a movable member to enable mechanical power to be advantageously transmitted to the interior thereof.

The invention is especially adapted for the housings of air compressors and similar casings, and an object is to render leak-proof the bearings of the machine. For example, when a rotary compressor is establishing a vacuum in a vessel to which it is connected the pressure inside will be less than that of the atmosphere, and if leakage should occur, air from without would enter the housing and reduce the degree of vacuum obtained, thus decreasing the efficiency of the unit. To prevent this, the casing is made as tight as possible and the bearings of the shaft are surrounded by suitable channels of such construction that when a sealing medium is transmitted through the channels it makes contact with the shaft and forms a perfect non-frictional packing. The presence of said medium thus makes the entrance of air by leakage into the casing impossible. But the sealing medium must be supplied at a predetermined rate and must be pure and without suspended matter that would cause erosion of the shaft and other damage.

In its preferred form the invention satisfies these requirements. It comprises a box or tank to receive water from the city pipes with a valve or valves in the principal space to control the outflow, and the tank contains one or more filters, each in a separate compartment so arranged that the filters can be removed for cleaning without risk of any of the contents being dropped into the liquid after it has passed therethrough. The filter compartments have suitable drain connections and the main outlet from the tank has a trap therein to arrest any suspended matter that the filters may have failed to retain, thus insuring thorough straining and regulation of the sealing medium before it is discharged from the said tank.

The utility and advantages of the invention will be made fully apparent in the following description. But while the drawing shows only one embodiment of the invention, I reserve the right to make changes in shape, size and arrangement of the parts consistent with the spirit and scope of the invention and embraced within the meanings of the appended claims.

On the drawing

Figure 1 shows a top view of the invention with the cover removed, and

Figure 2 is a section on the line 2—2 of Figure 1.

The numerals identify the same parts throughout.

The construction illustrated comprises a tank or reservoir 1 into which water or other sealing liquid flows through one or more supply pipes 2 and in each pipe is a valve that can be opened and shut by turning a knob or handle 3. In the tank the water is thoroughly strained and then discharged through an outlet 4 leading to a pipe 5 that runs for example to the bearing or bearings of a shaft in the housing of a rotary compressor. The tank 1 contains several filter compartments 6 each containing a filter element 7. Each filter compartment receives water through one of the pipes 2, which are conveniently connected to a common supply main. Each of the filters or strainers 7 is made of suitable material and has the form of a tube closed at the bottom, with an open top surrounded by a ring 8 that rests upon a seat 9 in the top of the compartment 6 in position to receive the water from the adjacent pipe 2. At its upper end each of the compartments is closed by a screw plug 10 and the top of each filter has affixed thereto a hook 11. When the filter is in position, the plug 10 presses on this hook and holds the ring against the seat 9. Upon the unscrewing of the plug 10 the filter or strainer can be taken out by engaging the hook 11 with a tool and lifting it.

After passing through the strainer 7 in each compartment 6, the water leaves said compartment through a passage 12 in a projection 13 on the outside of each compartment 6 and has an outlet 14 into the principal space within the tank 1. Each outlet 14 is controlled by a valve 17 actuated by a float lever 15 pivoted at 16 on the projection 13. This valve is pointed for the opening 14 and slides in bearings in the projection 13 as indicated at 18. The valve has a notch 19 engaged by a pin 20 on the float lever, the arrangement being such that when the water level in the tank 1 drops, the float levers open the valves 17 and when the water level rises the float levers are lifted to move the valves 17 to close the openings 14, and the flow of water through the filters 7 and to the tank 1 is stopped. The tank has a removable cover 21 with a handle 22, and the bottoms of the compartments 6 can be drained through connections 28 leading to a pipe 23.

With this construction the water or other fluid entering the tank is strained in the several filter compartments 6 to remove particles that might be suspended therein and is delivered to the main space or common reservoir containing the float levers by way of the ports 14. The plugs 10 are just below the top 21 and when it becomes necessary to clean the strainers or filters 7 these plugs are removed and the filters lifted. Any filter 7 can thus be extracted without holding it over the main space in the tank 1, and dirt that may be in the filter is not likely to be dropped into the water which has passed through the active filters. Hence the danger of the water becoming charged with particles of sand or the like after straining is obviated.

After being strained, the water flows through the outlet 4 to the pipe 5 which is connected to this outlet opening through a section 24 and a T-coupling 25. The other end of the coupling delivers to a short vertical pipe section 26 which has a cap 27 on its lower end. This section 26 acts as a trap or the like for any substance that may pass through the filters. Water flowing through the pipe 5 thus deposits in the trap 26 grit and other materials that may pass the filters 7. The trap can be cleaned by removing the closure 27. Therefore the water, when it is delivered to the bearing seals, is in properly purified condition.

The invention is thus seen to be quite simple and well adapted to give the desired results.

I claim:

1. Apparatus of the type described for purifying and controlling a sealing medium comprising a tank having a pair of inlet compartments and a common outlet compartment disposed laterally therein, a sealing liquid inlet conduit for each inlet compartment, separate control valves for each liquid inlet conduit, a removable liquid filter in each said inlet compartment, means defining a passage for filtrate from each said inlet compartment to the common outlet compartment, a drain conduit for both said inlet compartments, a separate filtrate float actuated means associated with each said passage and said outlet compartment to maintain the filtrate at a predetermined level in said outlet compartment, a removable closure for the tank, separate removable closures for each inlet compartment whereby access may be had to either inlet compartment without disturbing the apparatus and the liquid in the other compartment.

2. Apparatus of the type described for purifying and controlling a sealing medium comprising a tank having a pair of inlet compartments and a common outlet compartment disposed laterally therein, a sealing liquid inlet conduit for each inlet compartment, a drain conduit for both said inlet compartments, a filtrate outlet for said outlet compartment, separate control valves for each liquid inlet conduit, a removable filter in each inlet compartment, a shoulder formed in each inlet compartment, a ring on each filter to rest on the shoulder of its respective inlet compartment, a hook on each filter, means defining a passage from each inlet compartment to the common outlet compartment, a valve in each passage to control the flow of liquid from the respective inlet compartments to the common outlet compartment, an arm for actuating each last said valve, a float on each arm governed by the level of filtrate in the outlet compartment and adapted to maintain a predetermined filtrate level therein whereby a constant flow of sealing medium through the filtrate outlet is maintained, a removable closure for the tank and separate removable closures for each inlet compartment whereby access may be had to either inlet compartment without disturbing the apparatus and the liquid in the other inlet compartment and adapted to bear against said filter hooks and to normally maintain the filter rings on the inlet compartment shoulders.

JOHN KIRGAN.